May 12, 1959
C. R. CANALIZO
2,886,281
CONTROL VALVE
Filed March 5, 1957
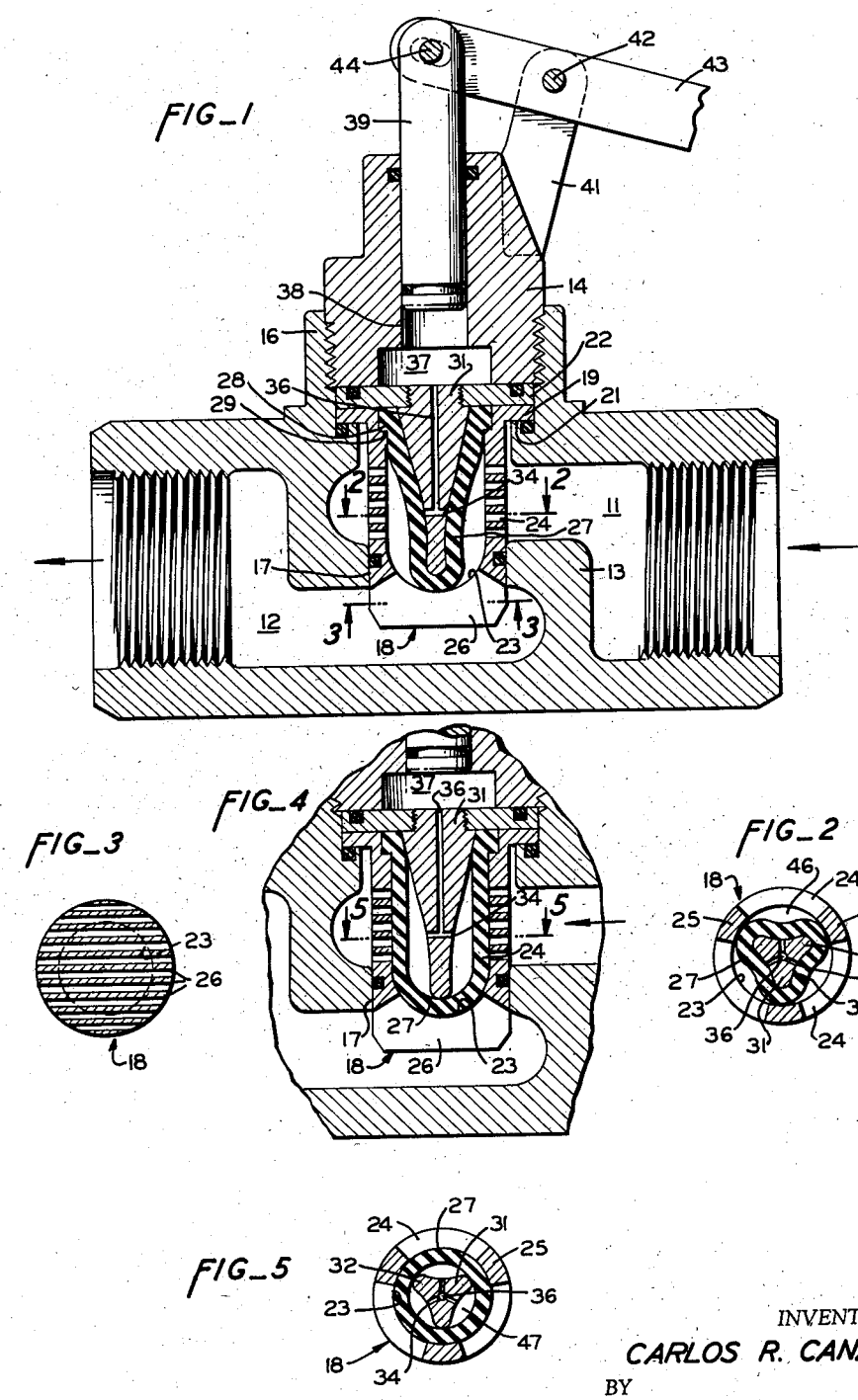
INVENTOR.
CARLOS R. CANALIZO
BY
Mellin and Hanscom
ATTORNEYS

United States Patent Office 2,886,281
Patented May 12, 1959

2,886,281

CONTROL VALVE

Carlos R. Canalizo, Dallas, Tex., assignor to Otis Engineering Corporation, Dallas, Tex., a corporation of Texas Application March 5, 1957, Serial No. 643,964

1 Claim. (Cl. 251—57)

This invention relates to valves and the like for controlling the passage of fluid therethrough.

It is a principal object of this invention to provide a valve having flow passages therethrough with a resilient valve member operable to open and close said flow passages to flow therethrough.

A further object of the invention is to provide a valve having inlet and outlet passages therein in communication with a valve chamber, a flexible valve member in the valve chamber adapted to flex between a position covering and sealing said passages and a position uncovering said passages, and means to flex said valve member into passage-sealing position.

It is a further object to provide a valve as set forth in the last object wherein the flexible valve member is prevented from elastic deformation.

It is yet another object to provide a valve having a plurality of flow orifices therethrough to provide a maximum fluid flow area and a resilient valve member adapted to flex against said flow orifices to seal off fluid flow therethrough.

Other objects and advantages will be apparent in the course of the following detailed description.

In the drawings, forming a part of the specification, and in which like reference numerals are used to represent like parts throughout the same, Fig. 1 is a cross-sectional view through a valve embodying the principle of the invention, and showing the valve in open position, to permit fluid flow therethrough.

Fig. 2 is a cross-sectional view taken on line 2—2 of Fig. 1.

Fig. 3 is a cross-sectional view taken on line 3—3 of Fig. 1.

Fig. 4 is a fragmentary cross-sectional view of a portion of Fig. 1, showing the valve in closed position, to interrupt the flow of fluid therethrough.

Fig. 5 is a cross-sectional view taken on line 5—5 of Fig. 4.

Referring now to the drawings, a generally T-shaped valve body 10 is provided, having an inlet chamber, or passage, 11 formed therein at one end of the valve body, and an outlet chamber, or passage, 12 formed therein at the other end of the body, the inlet and outlet chambers 11 and 12 being separated from one another by a partition member 13. A cap member 14 is threadedly fitted into the T-connection 16 of the valve body.

The partition 13 is provided with a generally circular passage 17 therethrough to receive the generally cup-shaped cage member 18 therein. The cage member 18 extends upwardly into the T-connection 16 of the valve body 10 and is provided with an outwardly extending peripheral flange 19 adapted to seat on shoulder 21 formed in the T-connection 16. When so seated, the cage member 18 is held in place by sealing plate 22 and cap member 14.

The cage member 18 forms a valve chamber having inner walls 23, and a plurality of groups of vertically spaced horizontal slots 24 are formed through the cage member 18 above partition 13, placing the inlet chamber 11 in fluid communication with the interior of the valve chamber. The groups of horizontal slots 24 are spaced circumferentially of the cage member by unslotted vertically extending portions 25 thereof. Similarly, a plurality of vertical slots 26 is formed through the cage member 18 generally below the partition 13, placing the interior of the valve chamber in fluid communication with the outlet chamber 12.

A generally cup-shaped resilient valve member, or diaphragm, 27 is disposed within the cage member 18, the valve member 27 having an exterior surface thereof conforming to the inner walls 23 of cage member 15. When the pressure is equal on the interior and exterior surfaces of the valve member 27, the unstressed valve member will be as shown in Fig. 4, with the exterior surface of the valve member in engagement with the inner walls 23 of cage member 18, so as to cover the slots 23 and 26 therethrough. The upper end of valve member 27 has an outwardly extending flange 28 enabling the valve member to be held in place between the sealing plate 22 and an annular shoulder 29 formed in the cage member 18. As one of the primary intended uses of the valve is in the control of oils and gases in oil fields, as shown in my copending application Serial No. 643,992, filed March 5, 1957, now abandoned, the valve member 27 is preferably of a material having a high resistance to the effects of hydrocarbons, and a preferred example of such a material is "hycar," a type of Buna-U rubber.

Secured to the sealing plate 22 and depending therefrom axially into the cage member 18 is a flexure control hub 31, having a generally triangular cross section, with the radially extending apices, or projections, 32 in engagement with the inner wall of the valve member 27, to hold the valve member at such points of engagement against the unslotted vertically extending portions 25 of cage member 18. The sides 33 of the hub 31 are indented between the apices 32, so that the flexible valve member 27 may flex thereinto away from the slots 24, with such flexing being limited to less than will produce a stretching, or elastic deformation, of the valve member 27.

A plurality of cross passages 34 is formed in hub 31 from the indented sides 33 thereof to a vertical passage 36 extending upwardly through the hub 31, the latter passage being in fluid communication with reservoir chamber 37 formed in cap member 14. The cap member 14 has a cylindrical bore 38 therethrough, in fluid communication with the reservoir chamber 37, to slidably receive piston 39 therein. An upwardly extending ear 41 is formed integrally with cap member 14 to provide a pivot support 42 for actuating handle 43, the latter being connected to piston 39 at 44.

In operation, the valve is assembled as shown in the drawings, with the reservoir chamber 37 and cylindrical bore 38 being filled with a preferably incompressible fluid, such as oil, and the inlet and outlet chambers are connected in a fluid flow line (not shown). With no pressure being exerted on the actuating handle 43, the pressure of the fluid entering the inlet chamber 11 will act through the horizontal slots 24 of cage member 18 to collapse the flexible valve member 27 around the hub 31 so as to uncover the cage member slots 24 and 26, as shown in Figs. 1 and 2. The fluid will then flow from the inlet chamber 11 through the horizontal slots 24 into the space 46 between the collapsed valve member 27 and the inner wall 23 of the cage member 18, and out through the vertical cage member slots 26 into the outlet chamber 12.

When it is desired to close the valve, the actuating handle 43 is manipulated to force the piston 39 downwardly in the cylindrical bore 38. The pressure exerted by the piston on the oil in the reservoir chamber 37 will force the oil through the hub passages 36 and 34 and into the space 47 between the valve member 27 and the hub 31 to flex the valve member from its collapsed position outwardly into tight sealing engagement with the inner wall 23 of cage member 18, whereby the horizontal and vertical cage slots 24 and 26 will be covered to prevent any fluid passage therethrough into the cage member.

The valve will remain closed until the downward force on piston 39 is removed. The fluid pressure on the exterior of the valve member will be greater than the internal pressure thereon and will cause it to collapse about hub 31, the fluid in space 47 being forced back into the reservoir chamber 37, and fluid may again flow through the cage slots 24 and 26.

If desired, the sealing fluid in the reservoir chamber 37 could be a compressible gas, if sufficient pressure is put on the gas by piston 39 so as to exert a greater force on the interior of cup member 27 than the force exerted on the exterior thereof by the fluid controlled by the valve, so as to flex the cup member 27 into sealing engagement with the cage slots 24 and 26. Furthermore, the valve might be used as a pressure relief valve, in that the reservoir could be subjected to a constant pressure. The valve would remain closed until the fluid pressure in the inlet or outlet chamber 11 or 12 rose to above the reservoir pressure, at which time the valve would automatically open.

The slots 24 and 26 are each sufficiently small in cross-sectional area so as to prevent the cup member 27 from being squeezed thereinto by the internal pressure in the cup member, and are sufficiently numerous so as to present a large aggregate area for the free passage of fluid therethrough.

It is to be understood that other methods of creating a pressure in the reservoir may be employed, in place of the lever and piston arrangement described herein. As for example, the piston 39 could be threaded into cap member 14 so that rotation of the piston will cause the piston to slide vertically within bore 38 to build up or reduce the reservoir pressure. Or, the piston 39 could be removed, and a conduit could be connected to bore 38 extending to a controllable source of pressurized fluid. In any event, it is merely necessary that some type of means be employed by which the pressure in reservoir chamber 37 may be increased or decreased as desired.

It should be further noted that in the operation of the valve the flexible valve member 27 is never subjected to any stretching, as it flexes between the operating positions as shown in Figs. 1 and 4, and thus the life of the valve member is prolonged. When it is desired to replace either the cage member 18 or the valve member 27, such replacement may easily be made by unscrewing the cap member 14 from the T-connection 16 to uncover the cage or valve.

From the foregoing it is apparent that the valve herein shown and described will provide a "bubble tight" shut off, since the valve does not depend upon a metal-to-metal seal for the closure of the valve, but rather utilizes a sealing engagement between a resilient valve member and the metal valve seats, i.e., the slots 24 and 26 in the cage member. The use of a resilient sealing member, in particular, greatly reduces valve wear when used to control fluids having highly abrasive constituents, as contrasted to a valve having metal-to-metal valve elements.

It is to be understood that the form of the invention herein shown and described, is to be taken, as a preferred embodiment of the same, and that various changes in the shape, size and arrangement of parts may be resorted to without departing from the spirit of my invention, or the scope of the attached claim.

Having described my invention, I claim:

A valve comprising a body member having a cup-shaped valve chamber therein, a first fluid passage in said body, a plurality of spaced slots formed around the inner wall of said valve chamber in communication with said first fluid passage, a second fluid passage in said body, a plurality of spaced slots formed around the inner wall of said valve chamber in communication with said second fluid passage, a valve member mounted in said valve chamber and having a hollow cup-shaped flexible portion in unstressed engagement with the inner wall of said valve chamber covering said pluralities of slots, a hub disposed axially within said flexible portion, said hub having radial projections holding said flexible portion in engagement with said inner chamber wall and being longitudinally indented between said radial projections to permit the unheld flexible portion to collapse thereinto away from said inner wall to uncover said slots, a third passage in said body member extending from the interior of said valve member to a point exterior of said valve chamber, and means to force fluid under pressure through said third passage into said valve member.

References Cited in the file of this patent

UNITED STATES PATENTS

| | | |
|---|---|---|
| 1,873,138 | Mitchell | Aug. 23, 1932 |
| 2,353,143 | Bryant | July 11, 1944 |
| 2,750,959 | Seggern | June 19, 1956 |
| 2,781,051 | Hawley | Feb. 12, 1957 |

FOREIGN PATENTS

| | | |
|---|---|---|
| 972 | Great Britain | Apr. 5, 1865 |
| 1,080,433 | France | June 2, 1954 |